Patented July 21, 1942

2,290,846

UNITED STATES PATENT OFFICE 2,290,846

THERAPEUTIC AGENT

Carleton Ellis, Montclair, N. J.; Carleton Ellis, Jr., and Bertram Ellis and Bank of Montclair, executors of said Carleton Ellis, deceased, assignors to Ellis Laboratories, Incorporated, a corporation of New Jersey No Drawing. Application October 24, 1940, Serial No. 362,643

4 Claims. (Cl. 260—288)

This invention relates to hydroxyquinolines and more specifically to certain derivatives of hydroxyquinolines and their preparation.

One object of my invention is to prepare certain derivatives of 8-hydroxyquinoline which exhibit therapeutic properties.

Another object is to prepare such a derivative of 8-hydroxyquinoline as to give about a neutral solution in water.

In order to illustrate more clearly the nature of the derivatives which I have prepared, some explanation of a theory of reaction is necessary. However, it must be pointed out that such theory as may follow is not intended to picture or explain exactly what does happen in the preparation of my derivatives, but is intended to clarify somewhat my invention. Such theory may be incorrect, or may be subject to later revision. In any event, I do not wish to be limited by any theory, but only by the prior art and by the claims appended to this specification.

Derivatives of hydroxyquinolines may be formed by any of the known syntheses. I prefer to use the following method, since the product so formed apparently is substituted in the 5 position. In this specification the positions of substituent groups and the formula of the 8-hydroxyquinoline molecule, sometimes called 8-quinolinol or oxyquinoline, are designated as follows:

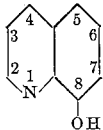

In the preparation of such components, according to my invention, the hydroxyquinoline is first sulfonated. The sulfonate is then reacted with a suitable reactant to block the hydroxyl group during subsequent steps; that is, to eliminate the tendency of the hydroxyl group to react with the reagents used in the following steps to give undesirable products. The sulfonic acid group is then chlorinated to give the corresponding sulfonyl chloride. Ammoniation is the next step, whereby the chlorine of the sulfonyl chloride group is replaced by an amido group and during said conversion the group blocking the hydroxyl is removed. Commonly, the product so obtained is a light-colored solid, usually yellow, and slightly soluble in water. A saturated solution of the above product in water has a pH of about 7.0. The color and pH seems to vary with the position and composition of any substituent groups attached to the hydroxyquinoline residue.

The purification of these compounds, in most cases, may be effected by a series of crystallization steps.

The following example more specifically illustrated the general steps involved but is in no way intended to limit this application either as to products or processes. For animals, the compound may be used in a crude or unpurified form, but for humans the purified form is better and is preferably used. All quantities are by weight.

One part by weight of 8-hydroxyquinoline was slowly mixed with 6 parts of fuming sulfuric acid (20–30% $SO_3$). The reaction mixture was vigorously stirred and a temperature between 0° and 5° C. maintained for 24 hours, after which the entire mass was gradually added to a mixture of 20 parts of ice and 10 parts water. The so-diluted reaction mass was allowed to stand in the cold for 24 hours more to effect separation of the sulfonic acid derivative. The precipitate was filtered on a Buchner funnel and washed several times with cold water. Residual water may be eliminated by drying in an oven at 100° to 120° C. In this way a sulfonated derivative, apparently 8-hydroxyquinoline-5-sulfonic acid was secured.

One mole of the dried sulfonated derivative, apparently 8-hydroxyquinoline-5-sulfonic acid, was gradually added to an aqueous solution containing two moles of sodium hydroxide. The solution was then cooled to 0–5° C. and while stirring rapidly 1.1 moles of ethyl chlorocarbonate were slowly added. After one-half hour, a cold aqueous solution containing one mole of hydrochloric acid was added to precipitate a derivative, apparently 8-carbethoxyquinoline-5-sulfonic acid (ethyl-[5 - sulphonquinolyl- 8]-carbonate). The product was filtered from the aqueous medium and dried.

Equal weights of 8-carbethoxyquinoline-5-sulfonic acid (ethyl-[5-sulphonquinolyl-8]-carbonate)

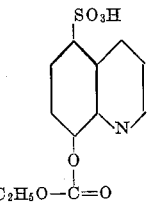

and phosphorus pentachloride were thoroughly mixed in a flask. When the initial reaction subsided, the flask and its contents were heated on a steam bath for one-half hour. Any phosphorus oxychloride formed, subsequently was removed by vacuum distillation. The white substance remaining in the flask was ground to a powder and mixed with equal parts of ice and water. A portion of the mixture, apparently a sulfonyl chloride derivative, being insoluble in cold water, was filtered from the aqueous media. The residue on the filter was then shaken with cold ethyl ether to remove impurities which are insoluble in the cold ether. The ether solution, after separation from the aqueous layer and filtration, was dried over anhydrous sodium sulfate.

The ether solution of 8-carbethoxyquinoline-5-sulfonyl chloride was cooled in an ice bath, while anhydrous gaseous ammonia was passed through the solution. A pale-yellow solid was precipitated. This precipitate was a mixture of ammonium chloride and the desired product. The solids were separated from the ether by filtration.

To obtain a pure product the powder filtered from the ether was dissolved in water. Carbon dioxide was blown through the solution until the solution was slightly acid. The product precipitated and was removed by filtration, washed with cold water and dried.

In place of 8-hydroxyquinoline other substituted hydroxyquinolines may be used. The halogen substituted and alkylated hydroxyquinolines are examples of the other materials that may be employed as previously described in this specification.

It is also contemplated that substituent groups formed by substitution of compounds, as herein disclosed, into known germicides, bactericides and the like will lead to the formation of new and useful materials. Such substitution may be brought about in any of the known methods or modifications thereof, the important feature being that the group or groups introduced into the new molecule should be a residue of one of the compounds herein disclosed.

Ordinarily, the $-SO_2NH_2$ group imparts toxic properties to a compound when said compound is taken internally either by oral or injection means. A totally unexpected property of these compounds is their non-toxic properties when administered to test animals as compared to other similar organic materials.

Concentrations as high as four per cent (in water) of the product therein disclosed may be injected or administered orally without any more apparent discomfort to said test animals than a similar quantity of water would cause. When the quantity of solution thus used becomes great, other effects overshadow any slight effect that may be caused by the compound or compounds being tested.

Other known compounds supposedly containing the $-SO_2NH_2$ grouping are exceedingly toxic when used in treating humans or animals, in quantities which are but a small fraction of the amount of that used in the preceding animal tests.

The uses for these compounds in the medical field and for other purposes, are many. They may be employed in place of other analogous compounds, depending upon the effect desired.

It is emphasized again that any theory which has been employed in the foregoing specification was used to clarify presentation of the disclosures and should not be construed as being either a part of or limiting said disclosures.

What I claim is:

1. The process of preparing a hydroxyquinoline sulfonamide comprising the following steps: Sulfonation of a hydroxyquinoline, blocking the hydroxy group by conversion to an alkyl carbonate group whereby an alkyl sulfoquinoline carbonate is formed, treatment of the alkyl sulfoquinoline carbonate with phosphorus pentachloride to form the corresponding sulfonyl chloride and, finally, ammoniation of the sulfonyl chloride to the desired product.

2. The process of preparing hydroxyquinoline derivatives, according to claim 1, wherein the hydroxyquinoline is 8-hydroxyquinoline.

3. A non-toxic substituted oxyquinoline compound which is 8-hydroxy-quinoline-5-sulfonamide.

4. The process of preparing 8-hydroxyquinoline-5-sulfonamide comprising the following steps: Sulfonation of 8-hydroxyquinoline whereby 8-hydroxyquinoline-5-sulfonic acid is formed, blocking the hydroxyl group by treatment of said sulfonic acid with ethyl chlorocarbonate whereby ethyl-[5-sulphoquinolyl-8]-carbonate is formed, treatment of said carbonate with phosphorus pentachloride to form the corresponding sulfonyl chloride, and ammoniation of said sulfonyl chloride to the desired product.

CARLETON ELLIS.